(12) United States Patent
Nachef et al.

(10) Patent No.: US 9,371,937 B2
(45) Date of Patent: Jun. 21, 2016

(54) MICRO-VALVE AND MICRO-FLUIDIC DEVICE USING SUCH

(75) Inventors: Kinda Nachef, Palaiseau (FR); Paul Guieze, Fontenailles (FR); Eric Donzier, Bercheres sur Vesgre (FR); Bertrand Bourlon, La Colle sur Loup (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1308 days.

(21) Appl. No.: 13/203,218

(22) PCT Filed: Feb. 19, 2010

(86) PCT No.: PCT/IB2010/050740
§ 371 (c)(1),
(2), (4) Date: Oct. 17, 2011

(87) PCT Pub. No.: WO2010/097740
PCT Pub. Date: Sep. 2, 2010

(65) Prior Publication Data
US 2012/0021529 A1    Jan. 26, 2012

Related U.S. Application Data

(60) Provisional application No. 61/154,883, filed on Feb. 24, 2009.

(51) Int. Cl.
| | |
|---|---|
| *G01N 1/10* | (2006.01) |
| *B01L 3/00* | (2006.01) |
| *B01L 99/00* | (2010.01) |
| *F16K 99/00* | (2006.01) |

(52) U.S. Cl.
CPC ....... *F16K 99/0001* (2013.01); *B01L 3/502738* (2013.01); *F16K 99/0015* (2013.01); *B01L 2400/0638* (2013.01); *F16K 2099/0084* (2013.01); *Y10T 436/2575* (2015.01)

(58) Field of Classification Search
CPC ............ F16K 99/0001; F16K 99/0015; F16K 99/0044; F16K 99/0048; F16K 99/0059; F16K 99/0061; F16K 2099/0069; F16K 2099/0086; F16K 2099/009; B01L 3/502738; B01L 2400/0638; Y10T 436/2575
See application file for complete search history.

(56) References Cited

U.S. PATENT DOCUMENTS

| | | | |
|---|---|---|---|
| 4,731,429 | A | 3/1988 | McMaster et al. |
| 4,767,827 | A | 8/1988 | Iwatsuki et al. |

(Continued)

FOREIGN PATENT DOCUMENTS

DE    10 2006 006706    8/2007

OTHER PUBLICATIONS

Machine translation of DE 10 2006 006 706 A1, obtained by the examiner from google.com/patents on Feb. 25, 2015.*

(Continued)

*Primary Examiner* — Christopher A Hixson
(74) *Attorney, Agent, or Firm* — Cameron R. Sneddon

(57) ABSTRACT

A micro-valve (10) adapted for integration with a micro-fluidic device such as a micro-injector of a chromatograph, the micro-valve having a first substrate (12), a second substrate (14) having microconduits (36,38) and a seating surface (30), and an actuation membrane (16) positioned between the first substrate (12) and the second substrate (14) for opening or closing a fluid path (48) of the micro-valve (10) under a force applied by a mechanism such as a pneumatic or piezoelectric device, wherein said actuation membrane (16) is constructed from a poly(aryl ether ketone).

36 Claims, 10 Drawing Sheets

(56) References Cited

U.S. PATENT DOCUMENTS

| | | | |
|---|---|---|---|
| 4,829,143 | A | 5/1989 | Clendinning et al. |
| 5,120,818 | A | 6/1992 | Robeson et al. |
| 5,124,413 | A | 6/1992 | Luise |
| 5,137,988 | A | 8/1992 | Matzner et al. |
| 6,406,605 | B1 | 6/2002 | Moles |
| 2002/0148992 | A1 | 10/2002 | Hayenga et al. |
| 2007/0183935 | A1* | 8/2007 | Clemmens et al. ............ 422/100 |
| 2007/0237686 | A1* | 10/2007 | Mathies et al. ............... 422/103 |
| 2007/0275193 | A1 | 11/2007 | Desimone et al. |
| 2011/0011156 | A1 | 1/2011 | Guieze |

OTHER PUBLICATIONS

K.W. Oh, C.H. Ahn, "A review of microvalves," J. Micromech Microeng. 16 (2006) R13-R16.

A. Luque, et al, "Integrable silicon microfluidic valve with pneumatic actuation," Sensors and Actuators, A 118 (2005) pp. 144-151.

J-C. Galas, et al, "Characterization of pneumatically activated microvalves by measuring electrical conductance," Microelectronic Engineering, 78-79 (2005), p. 112-117.

G. Thuillier, et al., "Development of a low cost hybrid SI/PDMS multi-layered pneumatic microvalve," Microsystem Technologies, 12 (2005), p. 180-0185.

J.P. Rolland, et al, "Solvent-resistant photocurable 'Liquid Teflon' for microfluidic device fabrication," J. Am. Chem. Soc. 126 (2004), p. 2322-2323.

Y. Liu, et al, "A TiNiPd thin film microvalve for high temperature applications mater", Sci. Eng. A378 (2004), p. 205-209.

G. Wiranto, et al, "The design of Miniature injector for Microengineered GC System," ICSE2000 Proceedings, Nov. 2000.

\* cited by examiner

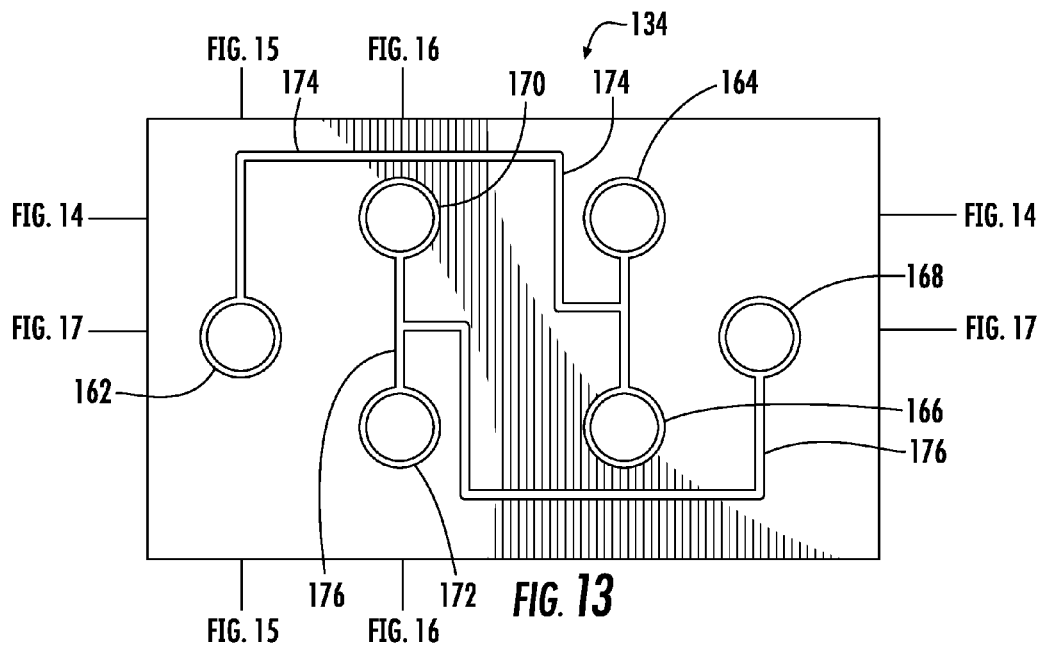
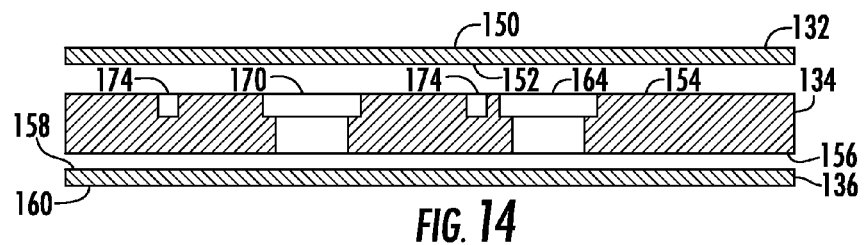
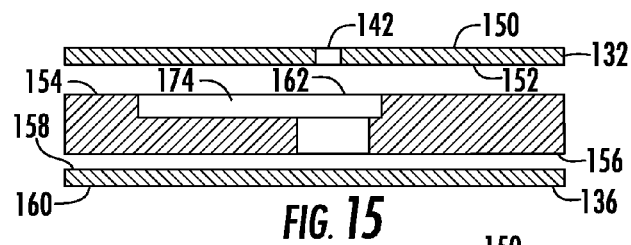
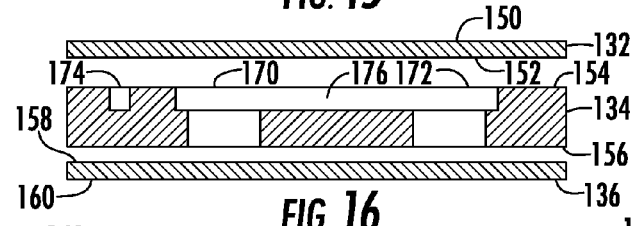
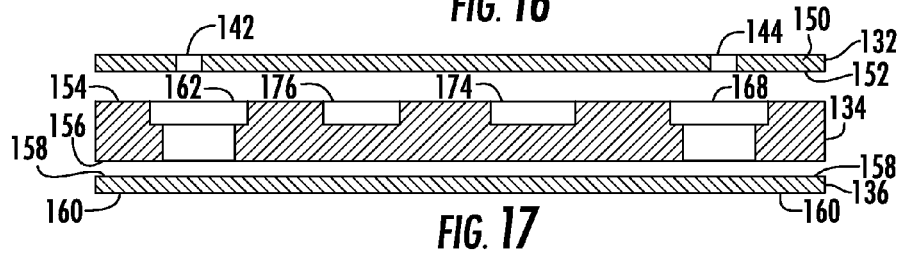

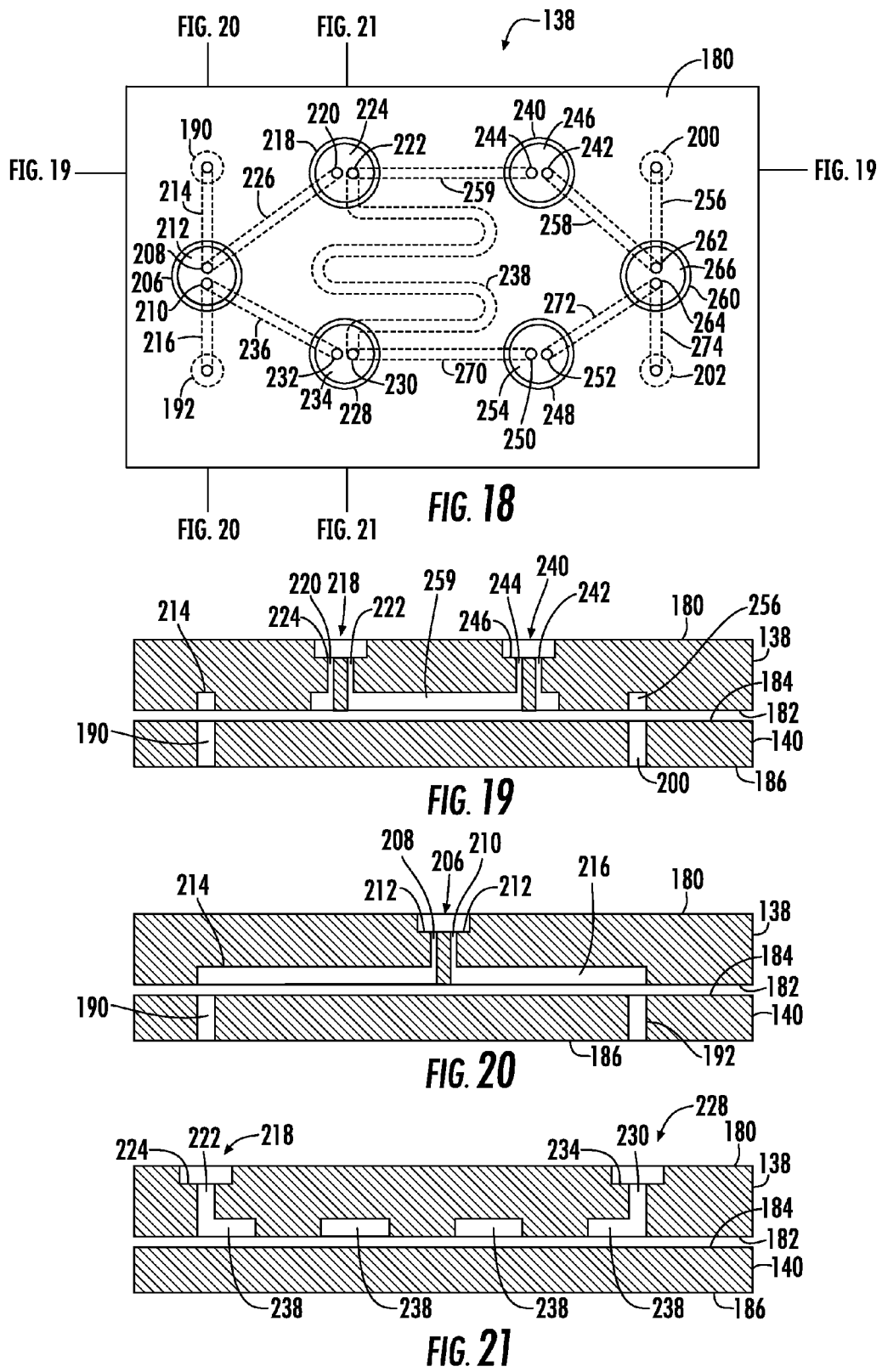

ated hereon# MICRO-VALVE AND MICRO-FLUIDIC DEVICE USING SUCH

CROSS-REFERENCE TO RELATED APPLICATION

The present application is based on and claims priority to U.S. Provisional Patent Application No. 61/154,883, filed Feb. 24, 2009, the entire contents of which is expressly incorporated herein by reference.

BACKGROUND

Embodiments disclosed herein relate generally to micro-valves, to processes for making such and to micro-fluidic devices using such.

Since the first integrated circuit, invented in 1958, miniaturization has become an important research topic in both electronic and non-electronic devices. In the late 1970s, miniaturization was extended to mechanical devices with electronics, which are now known as micro-electro-mechanical systems (MEMS), which have become increasingly popular. The miniaturization of analysis systems has appeared to have a great potential in a broad range of fields, from biomedical to space exploration. Indeed, MEMS enables one to not only minimize the costs of fabrication, but also to reduce the device power and fluid consumptions. Consequently, these systems have been reduced in size to micro scale for the realization of fully integrated micro-fluidic systems, such as lab-on-chip (LOC), micro-total analysis systems (μTAS) using gas/liquid sample injectors, mixers, micro-pumps and compressors.

Micro-valves constitute a basic micro-fluidic element: they are basic components of micro-fluidic systems and permit fluid transfer, switching and control. They are generally used in the fields of gas or liquid chromatography, fluids and pneumatics for controlling the flow of gases and liquids, i.e. fluid flows. MEMS technology has provided an opportunity for micro-valves to be packaged onto a fluidic board with integrated fluidic channels to interconnect all the parts. This is an arrangement similar to a printed circuit board in electronics. From the first pneumatic valves developed for gas flow control in the 1970s to their successful integration into large scale integrated fluidic systems, micro-valves, including their membranes, were mostly manufactured using silicon or metal. Such membranes are relatively simple to process using known etching techniques. For example, an article from A. Luque et al. (Sensors and Actuators, A 118 (2005) 144-151) discloses micro-valves comprising a polysilicon/silicon nitride membrane. However, the resulting devices are highly prone to leaking at ambient temperature due to the rigidity of silicon or metal-based materials.

Recent new developments used alternative materials such as polymers and elastomers. Common polymers used in micro-fabrication include polydimethylsiloxanes (PDMS) or polyimides. For example, an article from J C Galas et al. (Microelectronic Engineering, 78-79 (2005) 112-117) and an article from G. Thuillier (Microsyst Technol (2005) 12: 180-185) disclose micro-valves comprising a PDMS actuation membrane. However, the use of such polymers as PDMS results in non-negligible leaking devices when used with gas because of their porosity. Furthermore, such polymers are not aimed to be used in highly corrosive environments. For example, in gas processing systems, such polymers would likely deteriorate since such materials are not chemically inert to corrosive components such as hydrogen sulfide, thereby altering the quality and reproducibility of the analysis.

From a practical standpoint, the successful miniaturization and commercialization of fully integrated micro-fluidic systems have been delayed due to the lack of reliable micro-fluidic components, i.e., micro-pumps and micro-valves. See Kwang W Oh et al. (A Review of Microvalves, J. Micromech. Microeng. 16 (2006) R13-R39).

In the context of miniaturized sensors involving MEMS, it would be desirable to have a reliable non-leaking micro-valve that may be used in various environments, such as in boreholes, and which is chemically inert and which may be used in a wide range of working temperatures.

SUMMARY OF THE DISCLOSURE

In view of the foregoing disadvantages inherent in the known types of methods and apparatus present in the prior art, exemplary implementations of the present disclosure provide new and useful micro-valves, processes for making such and micro-fluidic devices using such, which avoid many of the defects and disadvantages of the prior art mentioned heretofore, and include many novel features which are not anticipated, rendered obvious, suggested, or even implied by any of the prior art devices or methods, either alone or in any combination thereof.

According to an aspect of the present disclosure, a micro-valve adapted for integration with a micro-fluidic chip is provided, the micro-valve comprising: a first substrate, a second substrate having a fluid path and a seating surface, and an actuation membrane between the first substrate and the second substrate able to press against the seating surface upon actuation thereof by an actuator thereby closing the fluid path, wherein said actuation membrane, in at least one embodiment, comprises a layer of at least one poly(aryl ether ketone), such as a poly(ether ketone), poly(ether ether ketone), poly (ether ketone ketone) and poly(ether ketone ether ketone ketone). The actuation membrane, in a non-limiting embodiment, may have a thickness of from about 1 μm to about 1 mm.

The first substrate of the micro-valve may be constructed from a material comprising at least one of silicon and glass, for example and may have a thickness of from about 10 μm to about 1100 μm, for example. Furthermore, the first substrate may comprise an actuation hole extending therethrough for enabling actuation (e.g., deformation) of the actuation membrane. The actuation hole may be etched through the first substrate, for example, via a deep reactive ion etching process. The actuation hole may have a diameter of from about 20 μm to about 5 mm, for example.

The second substrate of the micro-valve may be constructed from a material comprising at least one of silicon, a glass, and a silicon-on-insulator (SOI). In one embodiment, the second substrate may have a thickness of from about 150 μm to about 650 μm, for example. The silicon-on-insulator (SOI) material may comprise, for example, a sandwich material comprising a first layer of silicon, a layer of silicon dioxide as the insulator, and a second layer of silicon, with the second layer of silicon being in contact with the micro-chip, for example. The first layer of silicon of the SOI material can have a thickness of from about 0.1 μm to about 200 μm, for example. The second layer of silicon of the SOI material can have a thickness of from about 150 μm to about 600 μm, for example. The layer of silicon dioxide (or other insulating material) therebetween can have a thickness of from about 0.1 μm to about 10 μm, for example. The second substrate preferably comprises a first microconduit and a second microconduit which together form a portion of the fluid path. The first and second microconduits may be etched through the material of the second substrate via, for example, a deep reactive ion etching process. The first and second microconduits may have diameters of from about 5 µm to about 2 mm, for example, and may be separated from one another by a distance of from about 20 µm to about 2 mm, for example.

Further, the upper surface of the second substrate, which can be in contact with the flexible actuation membrane, may comprise at least one sealing ring or sealing surface. As such, the first layer of silicon and the layer of silicon dioxide of the second wafer may comprise at least one sealing ring or sealing surface. The sealing ring or sealing surface may be etched through the first layer of silicon and the layer of silicon dioxide or on the surface of the second wafer which can be in contact with the actuation membrane via, for example, a deep reactive ion etching process. The sealing rings or sealing surfaces may have a thickness of about 0.1 µm to about 200 µm, for example, and a width of about 50 µm to about 2 mm, for example. The sealing rings may have an inner diameter of about 50 µm to about 5 mm, for example. Likewise, the seating surface of the second substrate of the micro-valve may be mirror polished.

The micro-valve of the present invention may be actuated by pneumatic, piezoelectric, electromagnetic, electrostatic, or thermopneumatic actuation or any other effective actuation means which functions to cause a deformation of the actuation membrane. When the micro-valve is actuated by piezoelectric actuation, the micro-valve may further comprise, on the top of the actuation membrane and in the actuation hole of the first wafer, at least one of a silicone layer, a metallic layer and a combination thereof.

According to another aspect of the present disclosure, the invention is directed to a process/method for bonding together two silicon, glass, or silicon-on-insulator (SOI) wafers with a layer of a poly(aryl ether ketone) in between comprising: aligning the three components, placing them in a press in a clean environment, subjecting the assembly to a vacuum of from about $1 \times 10^{-14}$ bar to about 1 bar for example during from about 5 minutes to about 24 hours for example, heating the assembly at a temperature of from about 100° C. to about 380° C. during from about 5 seconds to about 1 hour, for example, applying a force on the assembly of from about 2 N to about 5000 N during from about 5 seconds to about 1 hour, for example, and cooling the assembly down to a temperature of from about 25° C. to about 80° C., for example, and venting.

Each micro-fluidic device of the present invention may comprise one or more micro-valves as described herein, for example one, two, three, four, five, six, seven, eight, nine, ten, eleven, twelve, or more of such micro-valves. Furthermore, the micro-fluidic device may be a micro-injector.

According to yet another aspect of the present disclosure, a micro-injector is provided comprising: a first substrate, a second substrate etched to form a plurality of fluid paths each comprising a seating surface, and an actuation membrane bonded between the first and second substrates, to open or close said plurality of fluid paths under pressures locally applied by an actuator to the actuating membrane, thus forming a plurality of micro-valves, wherein said actuation membrane comprises a layer preferably constructed of at least one poly(aryl ether ketone).

The micro-injector may further comprise outer layers having entry and exit holes for supplying sample fluids and a carrier fluid to each of the formed micro-valves, and flow channels. As such, the micro-injector may further comprise at least one of an injector sample entry hole, a carrier fluid entry hole, a column entry hole, an injector sample exit hole, to which the flow channels are linked. An upper surface of the second substrate can be in contact with the actuation membrane and may comprise at least one sealing ring or sealing surface for each of the formed micro-valves. The first substrate may comprise one actuation hole for each of the formed micro-valves, and actuation channels.

The micro-injector may comprise an outer layer connected to the second substrate for closing of the flow channels, and comprises entry holes for providing a sample fluid into the micro-injector. Furthermore, the micro-injector may comprise an outer layer connected to the first substrate and comprise actuation holes enabling the independent activation of one or more groups of formed micro-valves. The first substrate and outer layers preferably comprise at least one of silicon and glass and the second substrate preferably comprises at least one of silicon, glass and silicon on insulator (SOI) substrate.

Other aspects and advantages of the embodiments disclosed herein will be apparent from the following description and the appended claims.

BRIEF DESCRIPTION OF DRAWINGS

To assist those of ordinary skill in the relevant art in making and using the subject matter hereof, reference is made to the appended drawings, in which like reference numerals refer to similar elements:

FIG. 13 is a top plan view of the pressurization channel layer of the micro-injector of FIG. 12 of the present invention.

FIG. 14 is an exploded cross-sectional view of the upper three layers of FIG. 12 taken through line 14-14 of the micro-injector of FIG. 13.

FIG. 15 is an exploded cross-sectional view of the upper three layers of FIG. 12 taken through line 15-15 of the micro-injector of FIG. 13.

FIG. 16 is an exploded cross-sectional view of the upper three layers of FIG. 12 taken through line 16-16 of the micro-injector of FIG. 13.

FIG. 17 is an exploded cross-sectional view of the upper three layers of FIG. 12 taken through line 17-17 of the micro-injector of FIG. 13.

FIG. 18 is a top plan view of the flow channel layer of the micro-injector of FIG. 12 which shows flow channels in phantom.

FIG. 19 is an exploded cross-sectional view of the lower two layers of FIG. 12 taken through line 19-19 of the micro-injector of FIG. 18.

FIG. 20 is an exploded cross-sectional view of the lower two layers of FIG. 12 taken through line 20-20 of the micro-injector of FIG. 18.

FIG. 21 is an exploded cross-sectional view of the lower two layers of FIG. 12 taken through line 21-21 of the micro-injector of FIG. 18.

DESCRIPTION OF EXEMPLARY EMBODIMENTS

Figure 1:
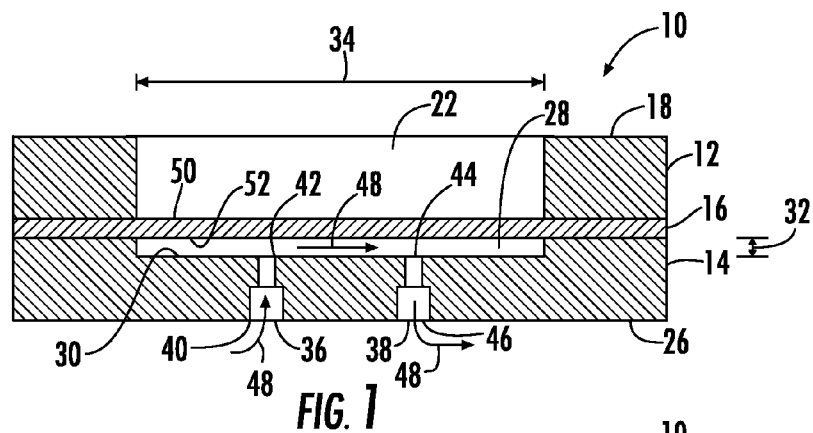
FIG. 1 shows a cross-sectional view of a micro-valve constructed in accordance with the present invention.

Specific embodiments of the present disclosure will now be described in detail with reference to the accompanying figures. Like elements in the various figures may be denoted by like reference numerals for consistency.

In the following detailed description, numerous specific details are set forth in order to provide a more thorough understanding of the disclosure. However, it will be apparent to a person having ordinary skill in the art that the present disclosure may be practiced without these specific details. In other instances, features which are well known to persons of ordinary skill in the art have not been described in detail to avoid complicating unnecessarily the description.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention provides a novel micro-mechanical valve for modulating fluid flow through a micro-fluidic device. The micro-valves of the present invention find use in a variety of different micro-fluidic devices. As used herein, the term "micro-fluidic" device refers to any device in which micro-volumes of fluid are manipulated along a fluid flow path during any given use or operation, e.g. sample preparation, sample analysis, sample separation, or chemical synthesis, where "micro-volume" means from about 1 nL to 1000 µL. The micro-fluidic devices contain at least one fluid flow path through which fluid flows through the device, where a plurality of flow paths that may or may not be intersecting and may be positioned in any convenient configuration may be present in the device, as described in greater detail herein.

The micro-fluidic devices of the present invention are characterized by having at least one micro-valve as described herein that modulates the flow of fluid along at least one fluid path in the device. As the micro-valve modulates the fluid flow through one or more of the fluid paths in the device (if the device comprises more than one fluid path), the micro-valve also modulates fluid flow through micro-compartments such as sample collection channels. By "modulates" is meant that the micro-valve is capable of at least restricting or enhancing fluid flow along the fluid path.

In preferred embodiments, the micro-valves and micro-injectors of the presenting invention may be one or more components of a gas or liquid chromatography apparatus for analysis of fluids and gases in boreholes (above-ground, or below-ground) or other gasfield or oilfield situations and may be used in a variety of environments and application such as, for example, other underground applications, underwater and/or space applications or any application where it is desirable to have a micro-scale chromatograph, such as in an underground mine, a gas or oil pipeline, or in a residential or commercial building or structure (e.g., a basement or crawlway). For example, the chromatograph of the present invention may be designed and constructed in such a manner as to be sized so that an individual person or animal can carry the unit for use in circumstances where the ability to use a heretofore known chromatograph is desirable but is not feasible or possible due to the size and bulkiness of chromatographic units.

Fluids, such as oil, natural gas and water, are commonly recovered from subterranean formations below the earth's surface. Drilling rigs at the surface are often used to bore long, slender wellbores into the earth's crust to the location of the subsurface fluid deposits to establish fluid communication with the surface through the drilled wellbore.

Surveying of a wellbore is often performed by inserting one or more survey instruments into a bottom hole assembly (BHA), and moving the BHA into or out of the wellbore. At selected intervals, usually about every 30 to 90 feet (10 to 30 meters), the BHA, having the instruments therein, is stopped so that measurement can be made for the generation of a survey station. Therefore, it is also contemplated herein that the present invention may comprise a component or instrument of such a BHA or a wireline tool, or a downhole drilling tool used to drill a wellbore.

As mentioned above, a micro-scale fluid analyzer using the micro-valves and micro-injectors contemplated herein are intended for separating fluids, including for example, a natural gas sample, into different components. Natural gas, as contemplated herein, is any gas produced from oil or gas reservoirs from exploration to production, generally has many components, the main components being nitrogen, carbon dioxide, hydrogen sulfide, methane, and various other alkanes particularly $C_2$-$C_6$ alkanes. It is highly desirable to be able to separate these various components of the natural gas from one another and it is especially desired to be able to identify $H_2S$ and $CO_2$, and oxygen when present, and to separate these from lower alkanes.

Figure 3:
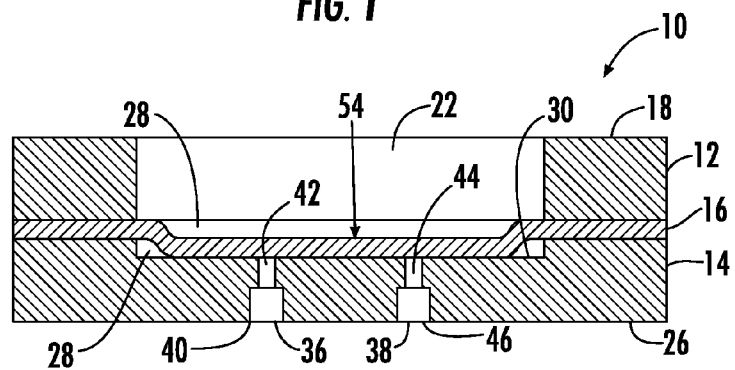
FIG. 3 shows a cross-sectional view of FIG. 1 wherein the actuation membrane is pressed against the seating surface of the micro-valve.
Figure 2:
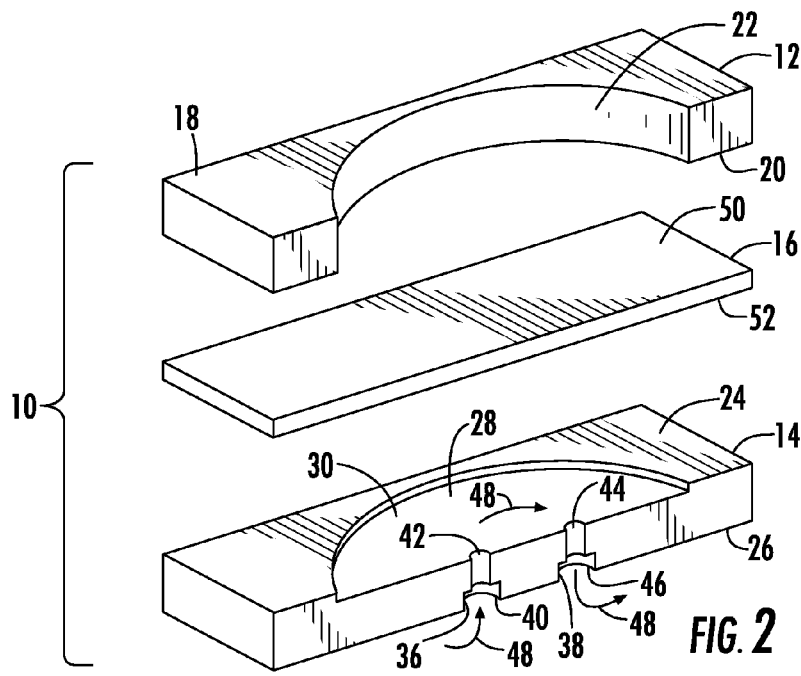
FIG. 2 shows a cut-away exploded perspective view of a micro-valve in accordance with the embodiment of FIG. 1.

Referring now to the figures, shown in FIGS. 1-3 (wherein FIG. 2 is an exploded view) and designated therein by general reference numeral 10 is a micro-valve constructed in accordance with the present invention. The micro-valve 10 is a two-way, ON/OFF type of micro-valve wherein in the ON position, a fluid path therein is open to allow a fluid (e.g., a gas or liquid) to flow therethrough and wherein in the OFF position, the fluid path is closed to stop the fluid flow through the micro-valve 10. As noted above and as explained in more detail below, the micro-valve 10 is intended to be a component of a more complex micro-electro-mechanical system (MEMS) such as a micro-chip, a micro-fluidic chip, a micro-injector, and/or a gas analysis system such as a gas chromatograph.

The micro-valve 10 could be integrally constructed within the more complex micro-electro-mechanical system, or could be connected thereto after its construction. In the MEMS of which the micro-valve 10 comprises a component, the micro-valve 10 is preferably connected to a fluid input conduit which provides a fluid to the fluid path of the micro-valve 10 and to a fluid output conduit through which flows the fluid exiting the micro-valve 10, as described in further detail below.

The micro-valve 10 is constructed of a first substrate 12, a second substrate 14, and an actuation membrane 16 which is sandwiched between the first substrate 12 and the second substrate 14. The first substrate 12 has an upper surface 18, a lower surface 20, and a hole 22 which preferably extends from the upper surface 18 to the lower surface 20. The second substrate 14 has an upper surface 24, a lower surface 26, and a recessed space 28 which has a seating surface 30, a depth 32, and a width 34. The second substrate 14 has at least a first microconduit 36 and a second microconduit 38, each which extends from the lower surface 26 or from a position below the seating surface 30 to the seating surface 30. The first microconduit 36 has an input end 40 for example at the lower surface 26 and an output end 42 at the seating surface 30. The second microconduit 38 has an input end 44 at the seating surface 30 and an output end 46 at the lower surface 26 or at a position below the seating surface 30. Together, the first microconduit 36, the recessed space 28, and the second microconduit 38 constitute a fluid path 48 within the micro-valve 10. The input end 40 of the first microconduit 36 optionally has a wider diameter than the output end 42 thereof as indicated in FIGS. 1-3, or the diameter of the first microconduit 36 may be substantially constant along its length. Alternatively the output end 42 may have a wider diameter than that of input end 40 (not shown). Similarly, the output end 46 of second microconduit 38 optionally has a wider diameter than the input end 44 as indicated in FIGS. 1-3, or the diameter of the second microconduit 38 may be substantially constant along its length. Alternatively the input end 44 may have a wider diameter than the output end 46 (not shown). The actuation membrane 16 has an upper surface 50 and a lower surface 52. As noted above, the actuation membrane 16 is positioned between first substrate 12 and second substrate 14 such that a portion of the upper surface 50 is abutted against a portion of the lower surface 20 of first substrate 12 and against a portion of the upper surface 24 of the second substrate 14 and is preferably bonded, attached, or connected thereto for example by an adhesive material, or by other bonding means known to persons of ordinary skill in the art.

As indicated in FIG. 1, the fluid path 48 flows through the first microconduit 36, then into the recessed space 28, then into the second microconduit 38, wherefrom it exits through the output end 46. A fluid is able to flow through the fluid path 48 until, or unless, a force 54 is exerted upon the actuation membrane 16 through the hole 22 in the first substrate 12. As indicated in FIG. 3, when the force 54 is exerted on the actuation membrane 16, a portion of the actuation membrane 16 is pushed into the recessed space 28 of the second substrate 14 against the seating surface 30 wherein at least one of, or both, the output end 42 of the first microconduit 36 and the input end 44 of the second microconduit 38 become blocked by the actuation membrane 16 thereby closing the fluid path 48 and causing stoppage of the flow of fluid therethrough. When the force 54 is removed from the actuation membrane 16 (as in FIG. 1) the actuation membrane 16 returns to the "open" position thereby opening the fluid path 48 and allowing the fluid to flow therethrough.

According to the present disclosure, the actuation membrane 16 in a particularly preferred embodiment comprises a flexible layer of at least one poly(aryl ether ketone). Poly(aryl ether ketones) are high performance engineering thermoplastic polymers which possess excellent properties such as chemical resistance, high melting and glass transition temperatures, and excellent mechanical properties. As a result, these polymers have a variety of uses and may be made into articles of various shapes or coated onto an article.

According to certain embodiments of the present disclosure, the actuation membrane 16 comprises at least one of poly(ether ketone), poly(ether ether ketone), poly(ether ketone ketone) and poly(ether ketone ether ketone ketone). In a preferred embodiment, the actuation membrane 16 comprises a poly(ether ether ketone) (i.e., "PEEK"). Poly(ether ether ketone) is one of the most chemically and temperature inert polymers, and has low air permeability (which contributes to the ability of the actuation membrane 16 to cause a complete, hermetic seal when closed). PEEK is a semicrystalline thermoplastic polymer which melts at around 350° C. at atmospheric pressure, and is highly resistant to thermal degradation. This material is resistant to both organic and aqueous environments, and has been used for example in bearings, piston parts, pumps, compressor plate valves, and cable insulation applications. PEEK exhibits good chemical resistance in many environments, including alkalis (e.g., sodium, potassium and ammonium hydroxides), aromatic hydrocarbons, alcohols (e.g., ethanol, propanol), greases, oils, corrosive chemicals (e.g., hydrogen sulfide) and halogenated hydrocarbons. Its permeation for oxygen is of about 76 gm/m$^2$/day/bar which is roughly half of the permeation of gases through films comprising amorphous polymers, and clearly below the permeation of most polymers and especially polymers generally used in MEMS, such as PDMS.

Examples of poly(aryl ether ketones) that may be used to construct the actuation membrane of the present invention include, but are not limited, to U.S. Pat. Nos. 5,124,413; 5,120,818; 4,767,827; 5,137,988; 4,731,429; and 4,829,143.

The actuation membrane 16 in a non-limiting embodiment of the invention has a thickness of from about 1 μm to about 1 mm, or from about 5 μm to about 500 μm, or from about 10 μm to about 100 μm.

The first substrate 12 may comprise at least one of silicon, silica, and glass. In preferred embodiments of the present disclosure, the first substrate 12 comprises silicon. Further, in non-limiting embodiments, the first substrate 12 may have a thickness of from about 10 μm to about 2000 μm, and more particularly from about 100 μm to about 1000 μm, or from about 200 μm to about 600 μm.

As described above, the first substrate 12 comprises an actuation hole 22, which may be etched through the first substrate 12 by any known etching technique, such as, but not limited to, a Deep Reactive Ion Etching (DRIE) process, a Reactive Ion Etching (RIE) process, or a wet chemical etching process, performed after a masking step. In a preferred embodiment, the actuation hole 22 is etched using a DRIE process. In non-limiting embodiments, the actuation hole 22 may have a diameter of, from about 20 μm to about 5 mm in some embodiments of the present disclosure, and from about 100 μm to about 3.5 mm in others, and from about 200 μm to 1000 μm in others.

According to embodiments of the present disclosure, the second substrate 14 may comprise at least one of silicon, glass, and silicon on insulator (SOI) substrate. The thickness of the second substrate 14 may be, for example, between about 50 µm and about 2000 µm in some embodiments, and about 100 µm to about 1000 µm in others, for example.

As contemplated herein the silicon dioxide and/or glass used in the components of the present invention may comprise not only silicon dioxide ($SiO_2$) or may be constructed from, or may also contain, other elements and compounds including, but not limited to, C, N, Na, $Na_2O$, Ca, CaO, Al, $Al_2O_3$, K, $K_2O$, S, $SO_3$, Mg, MgO, Ti, $TiO_2$, Fe, $Fe_2O_3$, B, $B_2O_3$, Ba, BaO, Pb, PbO, Zn, ZnO, Sb, $Sb_2O_3$, As, $As_2O_3$, Ge, $GeO_2$, Se, $GeSe_2$, P, F, Te, $TeO_2$, Ta, and $Ta_2O_5$.

Figure 4:
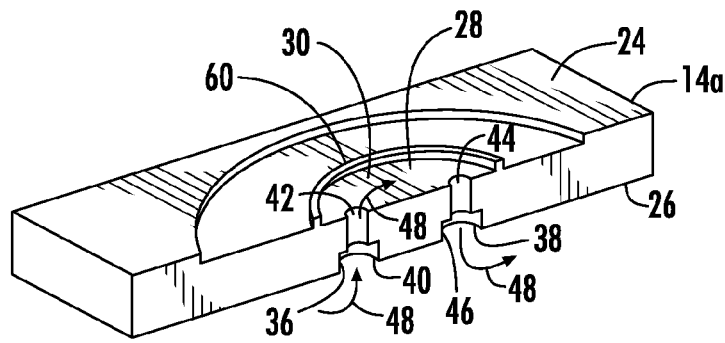
FIG. 4 is a cut-away perspective view of the bottom portion of the micro-valve of the present invention which has a sealing ring.
Figure 5:
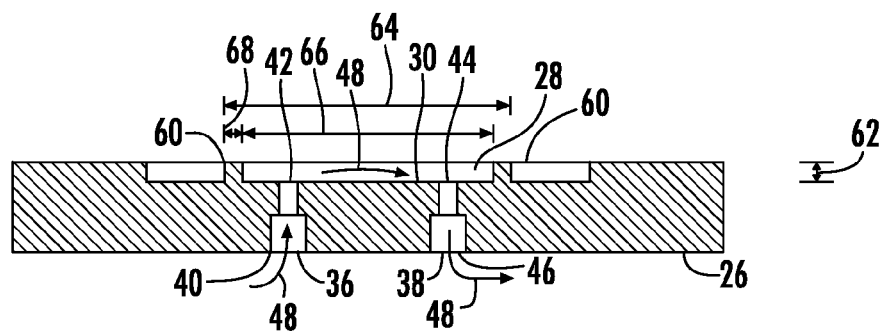
FIG. 5 is a cross-sectional view of the micro-valve of FIG. 4.

Shown in FIGS. 4 and 5, in an alternate embodiment, the micro-valve 10 of the present invention is constructed with a second substrate 14a (instead of second substrate 14) which comprises the features of second substrate 14 and also has a sealing ring 60 positioned on the seating surface 30 within the recessed space 28. The sealing ring has a height 62, an outer diameter 64, an inner diameter 66 and a width 68. The sealing ring 60 surrounds the output end 42 of the first microconduit 36 and the input end 44 of the second microconduit 38. The sealing ring 60 is positioned below actuation membrane 16 in the micro-valve 10 which comprises the second substrate 14a. The sealing ring 60 may be created by etching of the upper surface 24 of the second substrate 14a, creating at the same time the seating surface 30 of the alternate embodiment, micro-valve 10. In embodiments of the present invention where the second substrate is an SOI substrate comprising two layers of silicon and a sandwiched layer of an insulator as described below, the at least one sealing ring is positioned in a first silicon layer and in the insulator layer of the second substrate.

In some embodiments of the present disclosure, the seating surface 30 has a mirror polished surface. Likewise, at least one sealing ring may have a mirror polished surface, as well as any surface of the present invention. In some embodiments, the roughness of the mirror polished surface is smaller than 3 Angstroms RMS.

In the embodiments wherein the micro-valve 10 comprises the second substrate 14a, the fluid path 48 is therefore defined by the first and second microconduits 36 and 38 and that portion of the recessed space 28 within the sealing ring 60. When actuated in this embodiment, the portion of the actuation membrane 16 over the sealing ring 60 is pressed on the seating surface 30 within the sealing ring 60, thus closing hermetically the output end 42 and/or input end 44 thus stopping the flow of a fluid through the fluid path 48. The sealing ring 60 may be etched on the upper surface 24 of the second substrate 14 by any known etching techniques as discussed elsewhere herein including DRIE or a wet etching process.

The width 68 of the sealing ring 60 or sealing surface may be from about 50 µm to about 2 mm in some embodiments and of from about 100 µm to about 500 µm in others, for example. Furthermore, the sealing ring 60 may have an inner diameter 66 of about 50 µm to about 5 mm and an outer diameter 64 of 100 µm to about 6 mm, for example. Finally, the sealing ring 60 may have a height 62 of from about 0.1 µm to about 200 µm in some embodiments of the present disclosure, or from about 5 µm to about 50 µm in others, for example.

Figure 6:
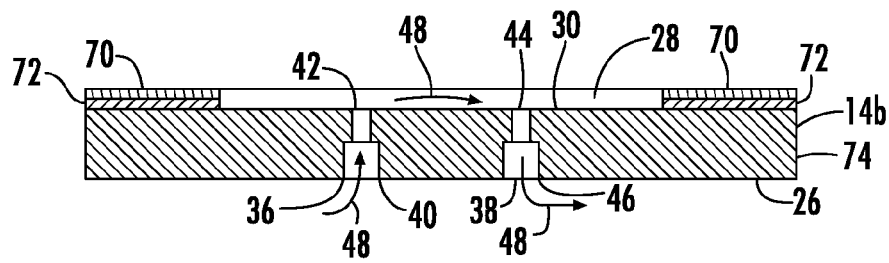
FIG. 6 is a cross-sectional view of an alternate embodiment of a micro-valve constructed in accordance with the present invention.
Figure 7:
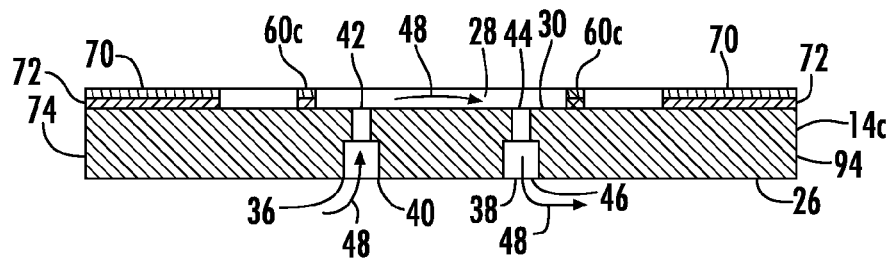
FIG. 7 is a cross-sectional view of another alternate embodiment of a micro-valve in accordance with the present invention.

Referring to FIGS. 6 and 7, in preferred embodiments of the micro-valve 10 of the present disclosure, the second substrate comprises an SOI substrate, as represented by second substrate 14b in FIG. 6 in one embodiment and by second substrate 14c in FIG. 7 in another embodiment. SOI substrates are layered silicon-insulator-silicon substrates, used in place of conventional silicon substrates in semiconductor manufacturing, especially micro-electronics, to reduce parasitic device capacitance and thereby improve performance. SOI-based devices differ from conventional silicon-built devices in that the silicon junction is above an electrical insulator, such as, but not limited to, silicon dioxide, silicon dioxide alloy, or sapphire. According to the preferred embodiments of the present disclosure as shown in FIGS. 6 and 7, the second substrates 14b and 14c comprise a silicon on insulator (SOI) substrate comprising a first layer of silicon 70, a layer of insulator 72 and a second layer of silicon 74.

The first layer of silicon 70 may have a thickness of, for example, from about 0.1 µm to about 200 µm in some embodiments of the present disclosure, or from about 5 µm to about 50 µm in others, for example. The second layer of silicon 74 may have a thickness of, for example, from about 150 µm to about 600 µm according to particular embodiments, and from about 250 µm to about 550 µm according to others, for example. The layer of insulator 72 may have a thickness of from about 0.1 µm to about 10 µm, and in some embodiments from about 0.2 µm to about 2 µm.

The second substrates 14b and 14c are etched or otherwise formed to comprise a fluid path 48 allowing a fluid to enter and exit the micro-valve 10 which in these preferred embodiments comprise either of second substrates 14b or 14c. In preferred embodiments of the present disclosure, the second substrates 14b and 14c comprise first and second microconduits 36 and 38 which are part of the fluid path 48. In embodiments of the present invention which comprise the second substrate 14b or 14c, the layers 70 and 72 have been etched to form the seating surface 30 in an exposed upper surface of second layer 74, and the first and second microconduits 36 and 38 are in the second layer 74.

The microconduits 36 and 38 are etched through the second substrate 14b and 14c (or through the second layer of silicon 74) by any known etching techniques such as, for example, a Deep Reactive Ion Etching (DRIE) process or a wet chemical etching process, performed after a masking step.

The first and second microconduits 36 and 38 may have a diameter of, for example, from about 5 µm to about 2 mm. In preferred embodiments, the first and second microconduits 36 and 38 may have a first, narrow diameter at ends 42 and 44, between, for example, about 5 µm to about 100 µm and may have a second, wider diameter at ends 40 and 46, for example, of from about 10 µm to about 2 mm. Furthermore, the centers of the output end 42 and input end may be separated from each other by a distance of about 20 µm to about 2 mm, for example. In preferred embodiments of the present disclosure, the centers of the output end 42 and input end 44 are separated from each other by a distance of about 40 µm to about 1.5 mm. The second substrate 14c is the same as second substrate 14b except second substrate 14c has a sealing ring 60c similar to sealing ring 60 of second substrate 14a.

The micro-valve 10 according to preferred embodiments of the present disclosure works as follows. In the ON (or Open) position, the actuation membrane 16 is not exposed to any actuation force or pressure, thus is the lower surface 52 of the actuation membrane 16 positioned from 0.1 µm to 200 µm above the seating surface 30. Therefore, a fluid injected into the first microconduit 36 will follow a path 48 over the seating surface 30, under the lower surface 52 of actuation membrane 16, through the second microconduit 38. Thus, the fluid path 48 is not blocked. In the OFF (or Closed) position, a pressure or force 54 is driven through the actuation hole 22 of first substrate 12 thereby pressing the actuation membrane 16 on the seating surface 30. The output end 42 and/or input end 44 at the seating surface 30 are then blocked by the actuation membrane 16, stopping the flow 36 of fluid through the fluid path 48.

The micro-valve 10 according to any of the embodiments disclosed herein may be actuated by any known actuation process, such as, but not limited to, pneumatic, piezoelectric, magnetic electromagnetic, electrostatic and thermopneumatic actuation. In a preferred embodiment, the micro-valve 10 is actuated by pneumatic actuation.

Figure 8:
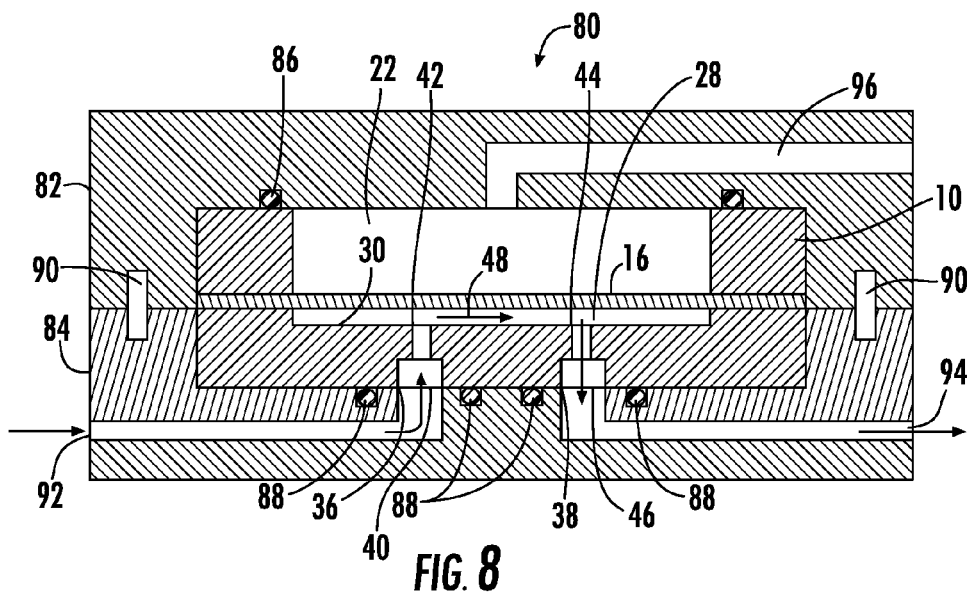
FIG. 8 shows a cross-sectional view of an apparatus constructed in accordance with the present invention having a pressure-actuated micro-valve.

Referring now to FIG. 8, a representation of an apparatus 80 comprising any one of micro-valves 10 contemplated herein is shown, according to an embodiment of the present invention in which pneumatic actuation is used. In one embodiment, the micro-valve 10 is positioned between an upper mechanical part 82 and a lower mechanical part 84. The upper mechanical part 82 is positioned over the micro-valve 10 wherein an O-ring 86 or other sealing element known in the art is positioned between the upper surface 18 of the micro-valve 10 and a lower surface of the upper mechanical part 82. Similarly, one or more O-rings 88 or other sealing elements known in the art is positioned between the lower surface 26 of the micro-valve 10 and an upper surface of the lower mechanical part 84. The upper mechanical part 82 and the lower mechanical part 84 may be connected together about the micro-valve 10 by fastening mechanisms 90 which may be for example bolts, screws, clips or any such mechanism known for fastening items together. The lower mechanical part 84 has a fluid input conduit 92 for delivering a fluid to the input end 40 of the micro-valve 10, and a fluid output conduit 94 through which fluid from the output end 46 of the micro-valve 10 passes to exit the apparatus 80.

In this manner, a fluid flow through the lower mechanical part 84 is enabled via the fluid path 48 of the micro-valve 10. The upper mechanical part 82 has at least one fluid input conduit 96 which is operatively connected with the hole 22 of the first substrate 12 of the micro-valve 10. A fluid such as a gas or liquid can be delivered through the fluid input conduit 96 to the hole 22 wherein pressure on the upper surface 50 of the actuation membrane 16 caused by the gas or fluid from input conduit 96 causes the actuation membrane 16 to interrupt and thereby close the fluid path 48 by pressing against the seating surface 30, thereby closing one or both of output end 42 and input end 44 in a manner such as that shown previously in FIG. 3 wherein force 54 presses down upon actuation membrane 16. Fluid flow through fluid path 48 in the micro-valve 10 is thereby stopped.

Figure 9:
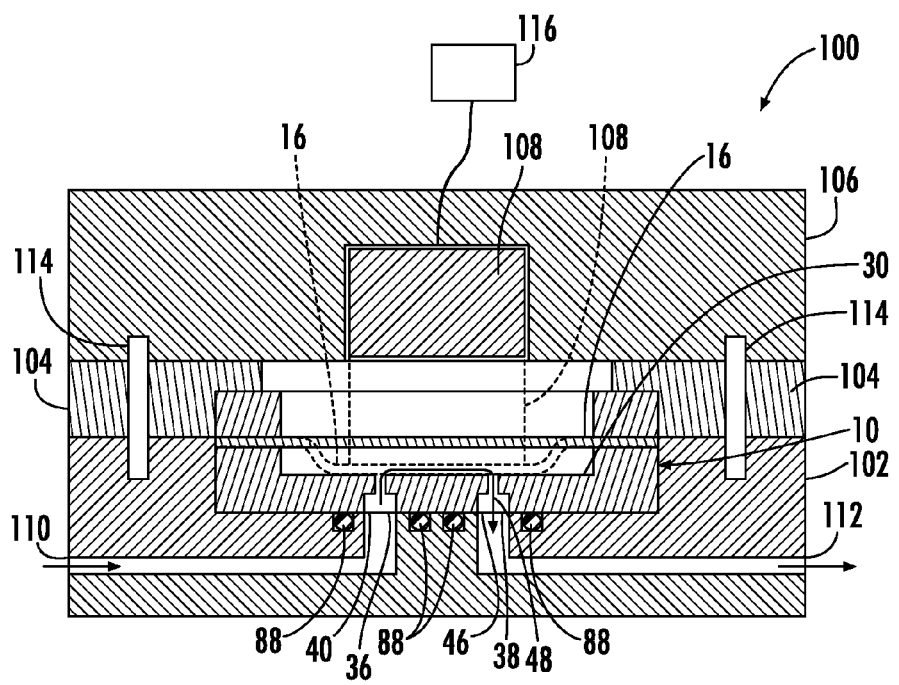
FIG. 9 shows a cross-sectional view of an apparatus having a piezoelectrically-activated micro-valve.

Piezoelectric materials are able to change dimensions upon exposure to an electric field. This ability enables the use of piezoelectric materials as actuators in the MEMS devices of the present invention. Therefore, in an embodiment of the invention, the micro-valve contemplates a micro-valve which is actuated by piezoelectric actuation. As shown in FIG. 9, a micro-electrical mechanical device 100 which comprises the micro-valve 10 shown in FIG. 8. The apparatus 100 comprises a lower mechanical part 102 upon which the micro-valve 10 can be positioned and secured.

The micro-electrical mechanical device 100 further optionally comprises a middle mechanical part 104 which rests upon the lower mechanical platform 102 in a position exterior to the micro-valve 10. Resting upon the middle mechanical part 104 is an upper mechanical part 106 which comprises a piezoelectric actuator 108 as a component thereof. The lower mechanical part 102 has a fluid input conduit 110 for delivering a fluid to the first microconduit 38 of micro-valve 10, and a fluid output conduit 112 through which a fluid flowing through the second microconduit 40 can pass to exit the device 100. The device 100 may comprise one or more O-rings 88 for sealing the fluidic connections between the micro-valve 10 and the fluid input and output conduits 110 and 112, respectively, of the lower mechanical part 102. Alternatively any other sealing devices known in the art may be used in lieu of O-rings. The lower mechanical part 102, the middle mechanical part 104 and the upper mechanical part 106 may be connected via a connecting device(s) 114 which may be screws, bolts, clips, or any other type of fastening or connecting means known to persons of ordinary skill in the art. Secured fluid connections between the micro-valve 10 and the lower mechanical part 102 are thereby obtained.

The piezoelectric actuator 108 comprises a piezoelectric ceramic material which is fabricated to extend or elongate in a longitudinal (vertical) direction when acted on by a voltage supplied by an electrical source 116. The piezoelectric actuator 108 is fixed in or on the upper mechanical part 106 by any known technique, and may for example be glued on the upper mechanical part 106. When the piezoelectric actuator 108 is activated by the electrical source 116, it lengthens (as indicated in phantom) and thereby presses the actuation membrane 16 of the micro-valve 10 against the actuation surface 30 (as indicated in phantom), of the micro-valve 10, thus closing the micro-valve 10 and interrupting the fluid flow therethrough. When the electrical current is decreased or driven back to zero, the piezoelectric actuator 108 shortens, causing its retraction from the actuation membrane 16 thereby opening the micro-valve 10 enabling the gas or liquid in the fluid path to again flow through the micro-valve 10 and exit the device 100 via output conduit 112.

In one embodiment, the actuation membrane 16 of micro-valve 10 comprises a layer of at least one of a silicone layer, a metallic layer or both.

Figure 10:
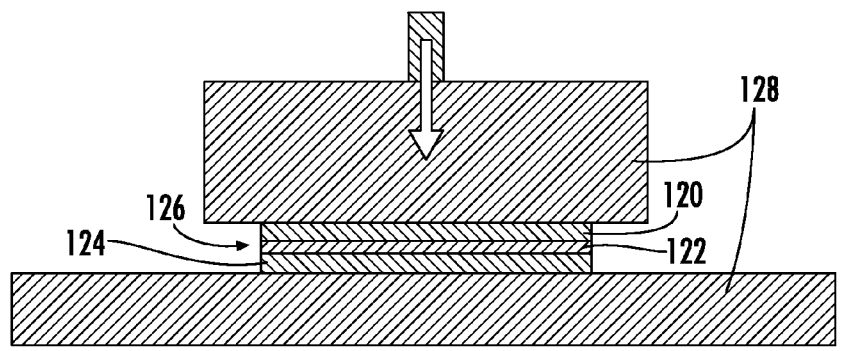
FIG. 10 is a cross-sectional view of a micro-valve bonding process according to the present invention.

An illustration of a process of the present invention for bonding two layers of at least one of a silicon, metal, glass, and silicon on insulator (SOI) substrate about a layer of a poly(aryl ether ketone) actuation membrane is shown in FIG. 10. An upper layer 120, a membrane layer 122, and a lower layer 124 are sandwiched to form a stack 126 then are aligned, for example microscopically. The stack 126 is then placed in a press 128 in a clean environment such as is used in the art and the press 128 is closed. The press 128 is preferably subjected to a vacuum of from about $1 \times 10^{-14}$ bar to about 1 bar during from about 5 minutes to about 24 hours, for example, in some embodiments of the present disclosure, or from about $1 \times 10^{-7}$ bar to about 1 bar, for example during from about 10 minutes to about 30 minutes. The press 128 may be heated at a temperature of from about 100° C. to about 380° C., for example, during from about 5 seconds to about 1 hour, in some embodiments, and from about 240° C. to about 380° C. during from about 10 seconds to about 10 minutes, in others, for example. Preferably the press 128 applies a force of from about 2 N to about 5000 N, for example, during from about 5 seconds to about 1 hour in some embodiments, and from about 100 N to about 3500 N during about 1 minute to about 20 minutes in others. The press 128 and stack 126 therein are left to cool to a temperature of preferably from about 25° C. to about 80° C. in some embodiments, and from about 30° C. to about 60° C. in others. The press 74 may then be vented. In this process, the three layers 120, 122, and 124 are pressed together at temperatures and pressures in order to definitively bond the actuation membrane 122 to the upper layer 120 and lower layer 124 and to a sealing ring or sealing surface thereof, if present.

Figure 11:
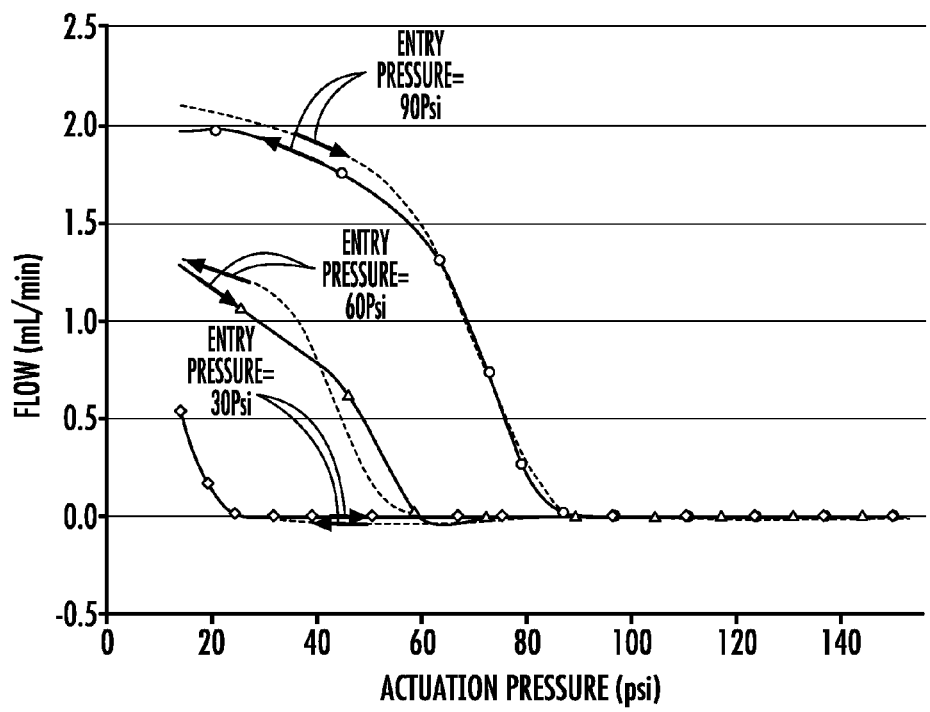
FIG. 11 is a graph showing a static behavior of a micro-valve constructed in accordance with the present invention.
Figure 12:
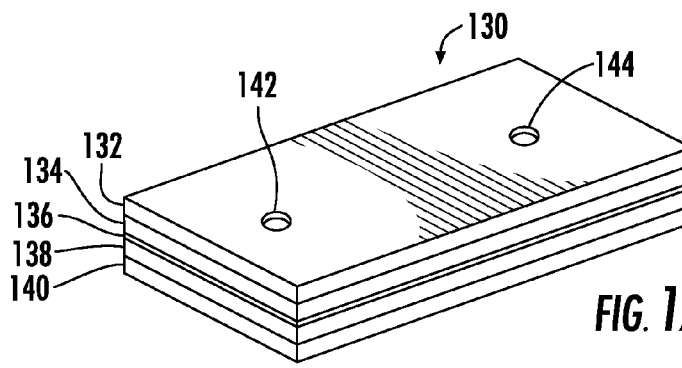
FIG. 12 is a perspective view of a micro-injector constructed in accordance with the present invention.

FIG. 11 is a graph representing the static behavior of the micro-valve 10 having first substrate 12, second substrate 14a (FIG. 5), and actuation membrane 16, as constructed in accordance with one embodiment of the present invention. The graph shows the flow of nitrogen, in mL/min, circulating in the micro-valve 10 described in FIG. 1 as a function of the actuation pressure, in Psi, applied to the actuation membrane 16. In this example, the diameters of the output end 42 and input end 44 of first and second micro-channels 36 and 38, respectively, of second substrate 14a are about 10 μm and the input end 40 and output end 44 have diameters of about 30 μm. The centers of the output end 42 and input end 44 are about 1.4 mm apart, the inner diameter 66 of the sealing ring 60 (of second substrate 14a) is about 3.44 mm, its width 68 is about 300 μm, and diameter of hole 22 in the first substrate 12 is about 3.34 mm. Three curves are shown on the graph of FIG. 11, each representing a different fluid pressure entering the first microconduit 36 of micro-valve 10 as described above. For each entry pressure, measures of flow are made from an actuation pressure applied to the actuation membrane 16 of about 15 psi, i.e., the micro-valve 10 is open, to about 150 psi, i.e., the micro-valve 10 is closed, and then back to about 15 psi. It may be observed that for an entry pressure of 30 psi, when pressure on the actuation membrane 16 reaches about 75 psi, there is no fluid flow through the micro-valve 10 and no leakage (<230 nL/min) For an entry pressure of 60 psi, when pressure on the actuation membrane 16 reaches about 85 psi, there is no fluid flow through the micro-valve 10, and no leakage (<230 nL/min) And for an entry pressure of 90 psi, when pressure on the actuation membrane 16 reaches about 145 psi, there is no fluid flow and no leakage (<200 nL/min) It has been experimentally determined that in a closed position, the leakage in the micro-valves according to the present disclosure is smaller than 230 nL/min.

It is a particular advantage of the micro-valves of the present invention that they are "air tight" when using very light gases (such as hydrogen or helium) and consequently have low leakages when closed. Furthermore, the chemical inertness of the materials used to construct the micro-valves allows them to be exposed to highly corrosive components, such as $H_2S$ and $CO_2$, and used under a wide range of working temperatures, such as, for example temperatures which occur during downhole drilling operations, as their reliability concerning the airtightness and chemical inertness is constant from ambient temperature to above 250° C.

The micro-valves according to the present disclosure are intended to be used as components of micro-fluidic devices such as micro-injectors, micro-gas routing blocks, micro-gas chromatographs, micro-pumps, micro-mixers or any other devices that comprise valves and that would be useful in micro-fluidic systems. In a preferred embodiment, the micro-fluidic device of which the micro-valves described herein are components is a micro-injector for example as described below in a non-limiting embodiment.

Micro-injector 130 comprises a first outer layer 132, a pressurization channel layer 134, an actuation membrane layer 136 constructed of the same materials described for the micro-valves above, a flow channel layer 138, and a second outer layer 140. The first outer layer 132 comprises a first pressure input aperture 142 and a second pressure input aperture, as discussed in further detail below. The first outer layer 132, pressurization channel layer 134, and actuation membrane layer 136 are described in further detail in regard to FIGS. 13-17. The pressurization channel layer 134 may be more broadly referred to herein as an actuation force layer.

The first outer layer 132 has an upper surface 150 and a lower surface 152. The pressurization channel layer 134 has an upper surface 154 and a lower surface 156. The actuation membrane 136 has an upper surface 158 and a lower surface 160. The pressurization channel layer 134 comprises a first actuation hole 162, a second actuation hole 164, a third actuation hole 166, a fourth actuation hole 168, a fifth actuation hole 170 and a sixth actuation hole 172. The first, second, and third actuation holes 162, 164, and 166 are in fluid communication via a first pressurization channel 174. The fourth, fifth, and sixth actuation holes 168, 170, and 172 are in fluid communication via a second pressurization channel 176. A pressurizing fluid such as a gas or liquid is supplied to the first pressurization channel 174 via the first pressure input aperture 142 (see FIGS. 15 and 17) and is supplied to the second pressurization channel 176 via the second pressure input aperture 144 (see FIG. 17).

The flow channel layer 138 and the second outer layer 140 are shown in more detail in FIGS. 18-21. The flow channel layer 138 has an upper surface 180 and a lower surface 182. The second outer layer 140 has an upper surface 184 which is positioned adjacent lower surface 182, and a lower surface 186. The second outer layer 140 also has a sample input hole 190 through which a sample fluid stream is passed into the micro-injector 130 and a sample output hole 192 through which the sample fluid stream passes out of the micro-injector 130, for example, after collection of a sample from the sample fluid stream. The second outer layer 140 further has a carrier fluid input hole 200 into which a carrier fluid stream is passed into the micro-injector 130, and a carrier fluid output hole 202 through which the carrier fluid stream passes out of the micro-injector 130. The flow channel layer 138 in this embodiment is constructed with a set of at least six micro-valves. The carrier fluid used with the micro-injector may be any gas or liquid used by persons of ordinary skill in the art of sample analysis, including, but not limited to, gases such as nitrogen, helium, argon, air, $H_2$, $CO_2$ (where it is not a component desired to be measured in a sample), and liquids such as alcohols, polar and non-polar solvents, other hydrocarbons, such as hexane or heptane, and sterile $H_2O$, for example.

A first micro-valve 206 has a first microconduit 208 and a second microconduit 210, and a seating surface 212. The first microconduit 208 is in fluid communication with the sample input hole 190 via a sample input flow channel 214 and the second microconduit 210 is in fluid communication with the sample output hole 192 via a sample output flow channel 216, as indicated in FIGS. 18 and 20. A second micro-valve 218 has (1) a first microconduit 220 which is in fluid communication with first microconduit 208 of first micro-valve 206 via a sample input flow channel 226, (2) a second microconduit 222, and (3) a seating surface 224. A third micro-valve 228 has a first microconduit 230, a seating surface 234, and a second microconduit 232 which is in fluid communication with second microconduit 210 of first micro-valve 206 via a sample flow channel 236 as indicated in FIG. 18. Second microconduit 222 of the second micro-valve 218 is in fluid communication with first microconduit 230 of the third micro-valve 228 via a sample collection channel 238, as shown in FIGS. 18 and 21, and which, optionally has a serpentine (or curved) configuration such as indicated in FIG. 18.

A fourth micro-valve 240 has a first microconduit 242, a seating surface 246 and a second microconduit 244 which is in fluid communication with the second microconduit 222 of second micro-valve 218 via a carrier fluid input flow channel 259 as indicated in FIGS. 18 and 19. A fifth micro-valve 248 has a first microconduit 250, a second microconduit 252, and a seating surface 254. The first microconduit 250 is in fluid communication with first microconduit 230 of third micro-valve 228 via carrier fluid output flow channel 270 as indicated in FIG. 18. A sixth micro-valve 260 has a first microconduit 262, a second microconduit 264, and a seating surface 266. The first microconduit 262 is in fluid communication with carrier fluid input hole 200 via carrier fluid input flow channel 256 and is in fluid communication with first microconduit 242 of fourth micro-valve 240 via carrier fluid flow channel 258. The second microconduit 264 of sixth micro-valve 260 is in fluid communication with second microconduit 252 of fifth micro-valve 248 via carrier fluid flow channel 272 and is in fluid communication with carrier fluid output hole 202 via carrier fluid output flow channel 274.

The pressurization channels 174 and 176 of the pressurization channel layer 134 become closed pressurization conduits when the lower surface 152 of the first outer layer 132 is disposed against and bonded to the upper surface 154 of the pressurization channel layer 134. Similarly, the flow channels 214, 216, 226, 236, 256, 258, 259, 270, 272, and 274 of the flow channel layer 138 become closed flow conduits when the upper surface 184 of the second outer layer 140 is disposed against and bonded to the lower surface 182 of the flow channel layer 138 which has said flow channels etched therein. The actuation membrane 136 is disposed between, and is bonded to at least one of, the lower surface 156 of the pressurization channel layer 134 and the upper surface 180 of the flow channel layer 138. The seating surface 212, 224, 234, 246, 254, and 266 of the micro-valves 206, 218, 228, 240, 248, and 260, respectively, may optionally each comprise a sealing ring such as shown in FIGS. 4, 5, and 7. Preferably the first outer layer 132 the second outer layer 140, and the pressurization channel layer 134 are preferably constructed from at least one of silicon and glass (or other material described herein), and the flow channel layer 138 is preferably constructed of silicon, glass, and/or an SOI substrate, and preferably, the actuation membrane 136 is constructed from a poly(aryl ether ketone) as explained in detail elsewhere herein.

In a preferred method of operation, the micro-injector 130 can be operated so that certain groups of the micro-valves thereof function simultaneously, and independently of another grouping of micro-valves. For example, in the configuration shown in FIGS. 13 and 18, first micro-valve 206, fourth micro-valve 240 and fifth micro-valve 248 together are actuated (opened or closed) simultaneously, and independently of second micro-valve 218, third micro-valve 228, and sixth micro-valve 260 which together are actuated (opened or closed) simultaneously, as discussed further below.

Figure 22:
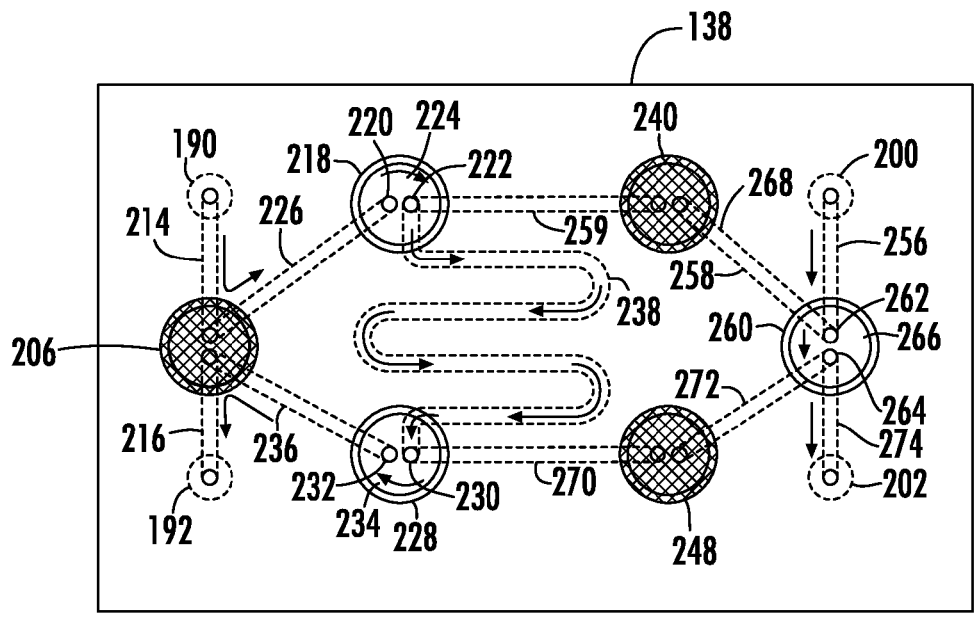
FIG. 22 is a top plan view showing an operational view of the flow channel layer of the micro-injector of FIG. 18 indicating a closure pattern of the micro-valves controlled by pressurization channel 174 of FIG. 13.
Figure 23:
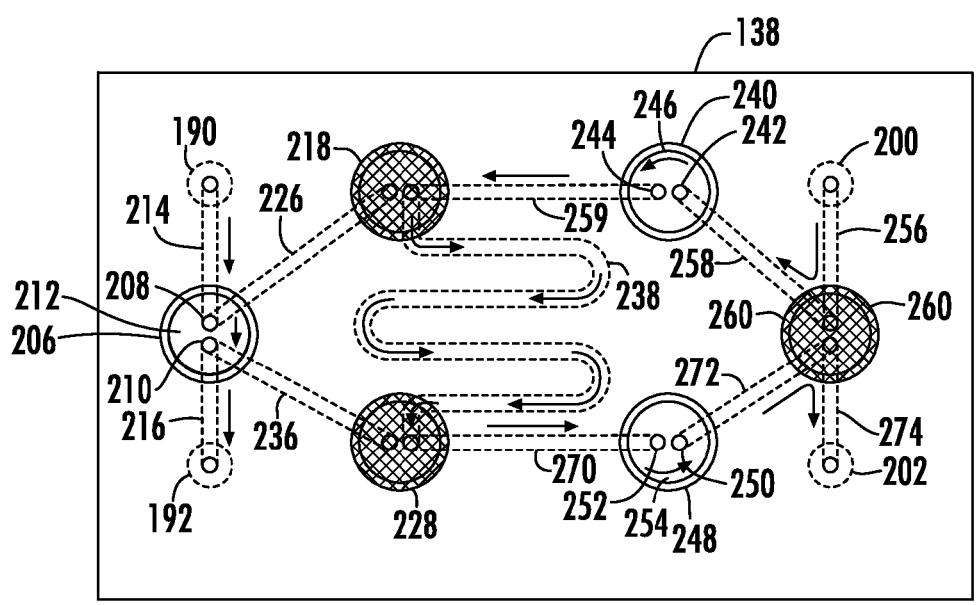
FIG. 23 is a top plan view showing an operational view of the flow channel layer of the micro-injector of FIG. 18 indicating a closure pattern of the micro-valves controlled by pressurization channel 176 of FIG. 13.

Operation of the micro-injector 130 is now described in relation to FIGS. 22 and 23. The micro-injector 130 functions in a preferred embodiment to obtain a sample of a sample fluid, such as a liquid or gas which may be obtained during a downhole drilling operation or from a gas or petroleum underground formation, or from any source which is desired to be analyzed, for example by a gas or liquid chromatograph and/or by a mass spectrometer, or other analytic device known in the art. In a sampling step as represented in FIG. 22, micro-valves 206, 240, and 248 are closed (as represented by crosshatching) by actuation of actuation membranes associated therewith in a manner such as is disclosed above, for example by a pressurized fluid (e.g., gas or liquid) flowing through first pressurization channel 174 (FIG. 13). Micro-valves 218, 228, and 260 are left open allowing a sample fluid to flow from sample input hole 190 through sample input flow channel 214 and sample flow channel 226, into sample collection channel 238, and therefrom through sample flow channel 236 and sample output flow channel 216 and out of the micro-injector 130 via sample output hole 192. This fluid path is forced by closure of micro-valves 206, 240, and 248 which blocks the fluid path between microconduits 208 and 210, between microconduits 242 and 244, and between microconduits 252 and 254. Further, during the sampling step, a carrier fluid (e.g., hydrogen, helium, air, sterile water, alcohol, or any other carrier fluid contemplated herein) is input into micro-injector 130 via carrier fluid input hole 200 and into carrier fluid input flow channel 256, wherefrom it passes into carrier fluid output flow channel 274 and carrier fluid output hole 202 by way of the fluid path through micro-valve 260, which is open. In this way, a sample of the sample fluid is collected in the sample collection channel 238.

In the next step as represented in FIG. 23 this sample of sample fluid, residing in sample collection channel 238, is carried by the carrier fluid to the analytic tool such as a microcolumn which is in fluid connection with the micro-injector 130 via the carrier fluid output hole 202. In this process, micro-valves 218, 228, and 260 are closed (as represented by crosshatching) by actuation of the actuation membranes associated therewith, by a pressurized fluid (e.g., a gas or liquid) flowing through second pressurization channel 176 (FIG. 13). Micro-valves 206, 240, and 248 are opened to allow direct fluid communication between microconduits 208 and 210 of micro-valve 206 wherein the sample fluid is vented, that is allowed to flow directly from sample input hole 190 to sample output hole 192 via micro-valve 206, thereby bypassing sample flow channels 226 and 236. The carrier fluid flowing in from carrier fluid input hole 200, upon closure of micro-valve 260, is diverted into carrier fluid flow channel 258, through open micro-valve 240 into carrier fluid flow channel 259, and therefrom into sample collection channel 238 where the carrier fluid pushes the fluid sample into carrier fluid flow channel 270, through micro-valve 248, into carrier fluid flow channel 272, and directly into carrier fluid output flow channel 274 and out of the micro-injector 130 through carrier fluid output hole 202, where, as noted before, it passes into an analytical component such as a microcolumn of a chromatograph and therefrom into a detector. It is also contemplated that in other embodiments of the present invention, the pressurization channel layer 134, as well as the first outer layer 132, may be replaced with a substrate layer which provides actuating forces by any other means, such as piezoelectric, magnetic, electromagnetic, thermoelectric, pneumatic, electrostatic, and thermopneumatic, and as such is referred to herein also as an actuating force layer or component.

Figure 24:
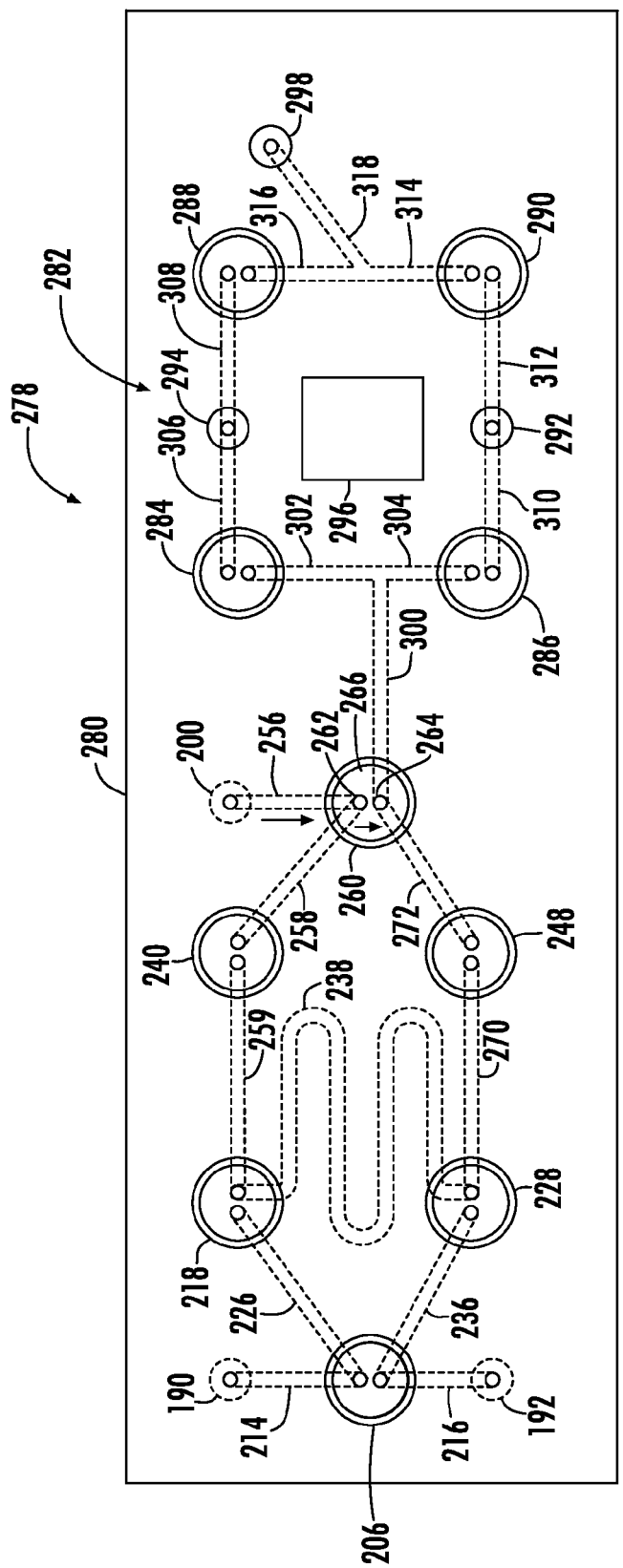
FIG. 24 is a top plan view of a micro-injector having a four-micro-valve back-flush system.
Figure 25:
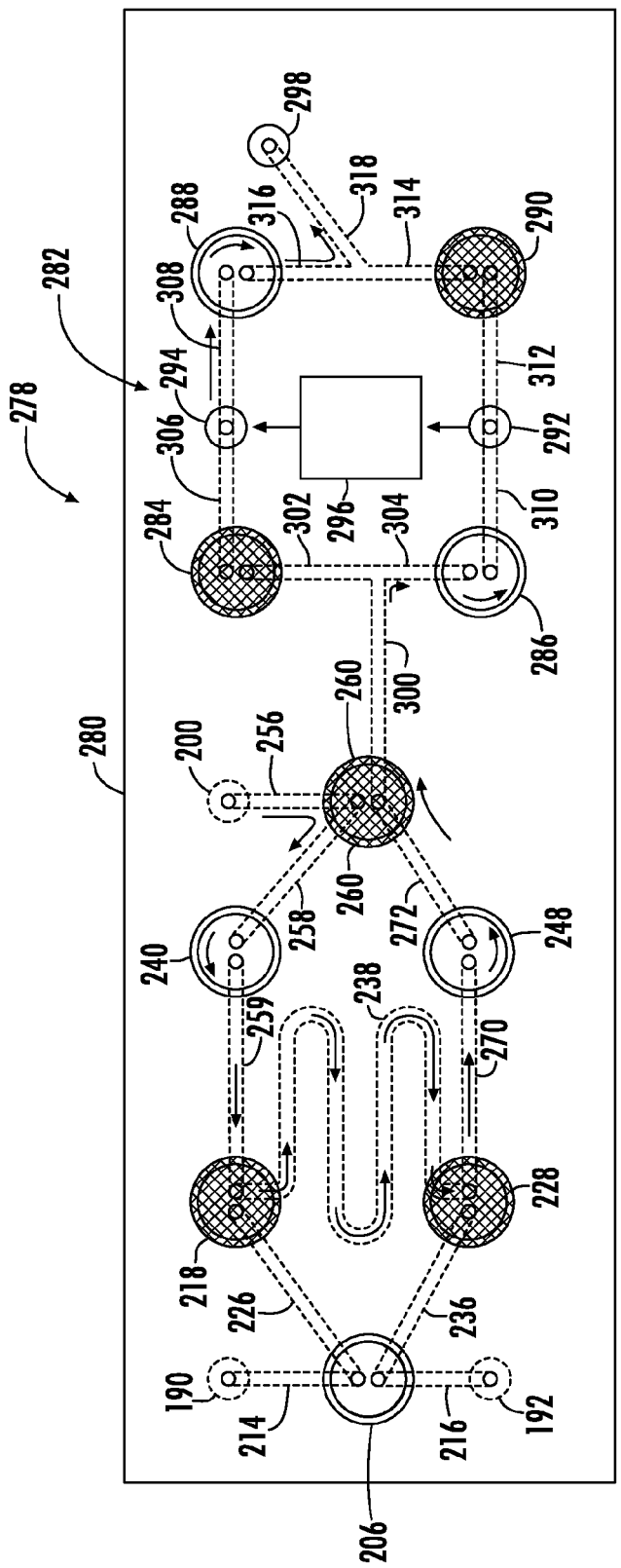
FIG. 25 is a top plan view of the micro-injector of FIG. 24 in a "forth-flush" operational mode.
Figure 26:
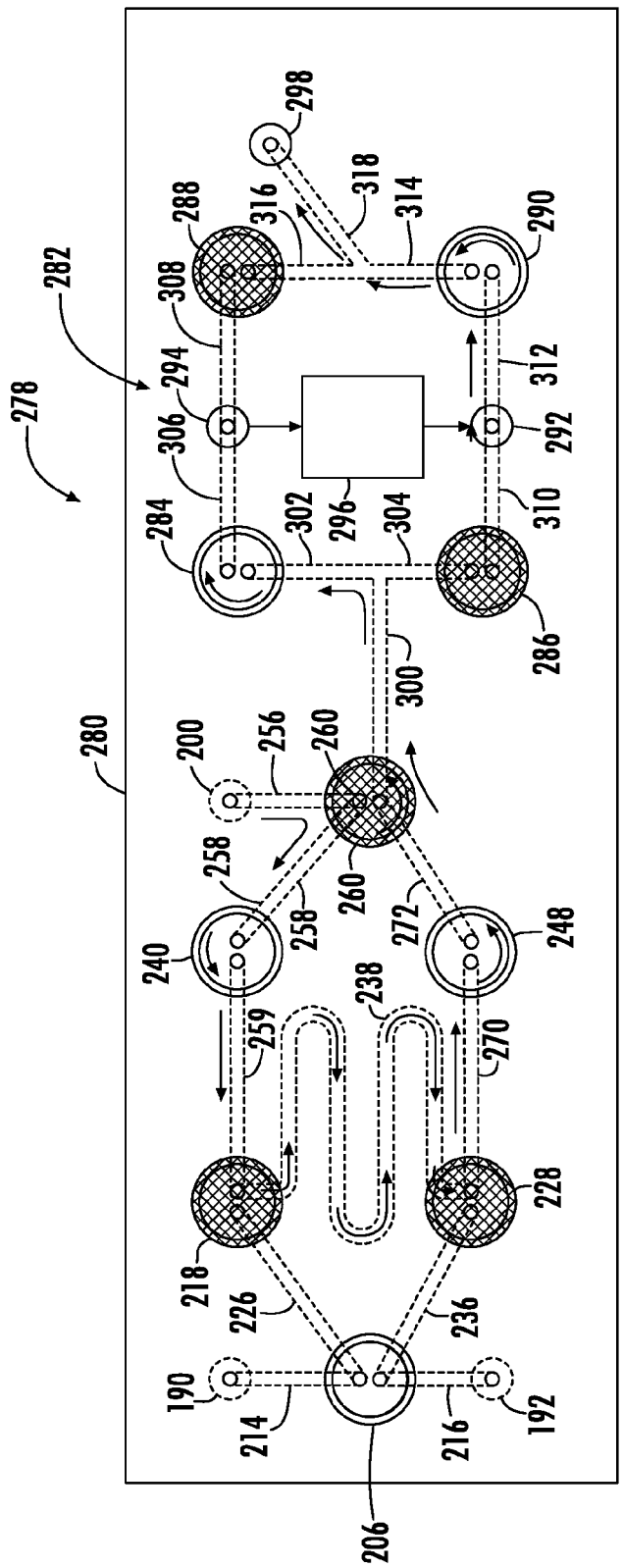
FIG. 26 is a top plan view of the micro-injector of FIG. 24 in a "back-flush" operational mode.

An alternate embodiment of a micro-injector of the present invention is designated in FIGS. 24-26 by the general reference numeral 278. The micro-injector 278 is understood to comprise similar components as shown in micro-injector 130, for example first and second outer layers, a pressurization channel layer, and a flow channel layer. However, only a flow channel layer 280 is represented in FIGS. 24-26, it being understood that the components which are not shown are constructed to operate in a similar manner as those of micro-injector 130, for example, wherein the pressurization channel layer has pressurization channels for actuation of the micro-valves in a manner necessary for operation as contemplated below. Micro-injector 278 has a set of ten micro-valves, including micro-valves 206, 218, 228, 240, 248, and 260, which are constructed in a manner and arranged in a configuration like that shown in FIGS. 18-23. The micro-injector 278 also has a sample input hole 190, a sample output hole 192, a carrier fluid input hole 200, a sample input flow channel 214, a sample output flow channel 216, sample flow channels 226 and 236, a carrier fluid input flow channel 256, carrier fluid flow channels 258, 259, 270, and 272, and a sample collection channel 238.

To obtain a sample of a sample fluid, the operation of micro-injector 278 is similar to that of micro-injector 130. In a sampling step (not shown) of micro-injector 278, micro-valves 218, 228, and 260 are closed, and micro-valves 206, 240, and 248 are left open allowing the sample fluid to flow into sample collection channel 238.

The micro-injector 278 differs from micro-injector 130 most significantly in that micro-injector 278 also comprises a four-micro-valve back-flush system 282 within the flow channel layer 280. The back-flush system 282 comprises a seventh micro-valve 284, an eighth micro-valve 286, a ninth micro-valve 288 and a tenth micro-valve 290. The back-flush system 282 has an output hole 292 to a separation column 296 and a return hole 294 from the separation column 296. The back-flush system further comprises a carrier fluid-analyte output hole 298 through which the carrier fluid exits the micro-injector 278 after having passed through the separation column 296. The carrier fluid flow channel 272 is in fluid communication with a carrier fluid output flow channel 300 which can carry the carrier fluid to either seventh micro-valve 284 via flow channel component 302 or to the eighth micro-valve 286 via flow channel component 304. Seventh micro-valve 284 is in fluid communication with ninth micro-valve 288 via flow channels 306 and 308 which are also in fluid communication with return hole 294. Eighth micro-valve 286 is in fluid communication with tenth micro-valve 290 via flow channels 310 and 312, which are also in fluid communication with output hole 292. Finally, ninth micro-valve 288 and tenth micro-valve 290 are in fluid communication by flow channels 314 and 316 which meet to form flow channel 318 which is in fluid communication with the carrier fluid-analyte output hole 298 which in one embodiment may lead to, for example, a micro thermal conductivity detector (μTCD).

The micro-injector 278 can function in both a "forth-flush" mode as represented in FIG. 25 and a "back-flush" mode as represented in FIG. 26. In the "forth-flush" mode, micro-valves 218, 228, 260, 284, and 290 are closed (as indicated in FIG. 25 by the cross-hatching) wherein carrier fluid entering at carrier fluid input hole 200 passes through the sample collection channel 238 and through flow channel 300 into flow channel 304, through micro-valve 286, into separation column 296, through return hole 294 and through micro-valve 288, then out of the output hole via flow channels 316 and 318.

In the "back-flush" mode, micro-valves 218, 228, 260, 286, and 288 are closed (as indicated in FIG. 26 by the cross-hatching) wherein carrier fluid entering at carrier fluid input hole 200 passes through the sample collection channel 238 and through flow channel 300 into flow channel 302, through micro-valve 284, then through return hole 294 into separation column 296, through output hole 292 and through micro-valve 290, then out of the output hole via flow channels 314 and 318.

In preferred embodiments of the present disclosure, the formed micro-valves in the micro-injector have entry and exit holes having a diameter of 5 μm to 50 μm, and more preferably 10 μm to 30 μm, the distance between the centers of the entry and exit holes may be about 20 μm to 1500 μm, and more preferably 50 μm to 1000 μm, the inner diameter of the sealing rings, where present, may be from about 50 μm to about 5 mm, and more preferably 1 mm to 2.5 mm, having a width from about 50 μm to about 2 mm, the actuation hole diameter may be about 20 μm to 5 mm, the distance between the centers of two micro-valves may be from about 100 μm to about 5 mm, the width of the flow channels permitting connection of the entry/exit holes of the different micro-valves may be from about 20 μm to about 1000 μm, and more preferably 30 μm to 400 μm, the width of the pressurization channels permitting the connection of the actuation pressures may be from about 20 μm to about 1000 μm, or more preferably 30 μm to 400 μm. The injected volume permitted by the micro-injector of the invention may be from about 10 nL to about 5 μL, and more preferably from about 60 nL to about 2 μL. Other embodiments of the micro-injectors of the present invention may have more or fewer than 6 micro-valves, and other embodiments of micro-injectors with a back-flush system may have more or fewer than 10 micro-valves.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

What is claimed is:

1. A micro-valve adapted for integration with a microfluidic system, comprising:
    a first substrate having a hole or channel extending through a portion thereof;
    a second substrate having a recessed space comprising a seating surface, a first microconduit and a second microconduit, the openings of the first and second microconduit bounded by the seating surface, wherein the first microconduit and the second microconduit each extend from the seating surface to a position below the seating surface and are in operative communication via the recessed space to form a fluid path; and
    an actuation membrane comprising a layer of at least one poly(aryl ether ketone) positioned between the first substrate and the second substrate over at least a portion of the seating surface such that when an actuation force is applied to the actuation membrane, the actuation membrane engages the seating surface of the second substrate wherein at least one of the first microconduit and the second microconduit becomes blocked to cause interruption of the fluid path.

2. The micro-valve of claim 1, wherein the actuation membrane comprises at least one of poly(ether ketone), poly(ether ether ketone), poly(ether ketone ketone), and poly(ether ketone ether ketone ketone).

3. The micro-valve of claim 2, wherein the actuation membrane comprises poly(ether ether ketone).

4. The micro-valve of claim 1, wherein the actuation membrane has a thickness of from about 1 μm to about 1 mm.

5. The micro-valve of claim 1, wherein the first substrate comprises at least one of silicon and a glass.

6. The micro-valve of claim 1, wherein the first substrate has a thickness of from about 10 μm to about 2000 μm.

7. The micro-valve of claim 1, wherein the hole in the first substrate extends from an upper surface of the first substrate through a lower surface of the first substrate.

8. The micro-valve of claim 1, wherein the hole or channel in the first substrate has a diameter of from about 20 μm to about 5 mm.

9. The micro-valve of claim 1, wherein the seating surface has a mirror polished surface.

10. The micro-valve of claim 1, wherein the second substrate comprises at least one of silicon, a glass, and a silicon on insulator (SOI) material.

11. The micro-valve of claim 1, wherein the second substrate comprises a silicon on insulator (SOI) material comprising a first layer of silicon, a second layer of silicon, and a layer of an insulator positioned between the first layer of silicon and second layer of silicon, wherein the recessed space is etched through the first layer of silicon.

12. The micro-valve of claim 11, wherein the recessed space is etched through the first layer of silicon and the insulator layer.

13. The micro-valve of claim 11, wherein the insulator layer comprises silicon dioxide.

14. The micro-valve of claim 11, wherein the first layer of silicon has a thickness of from about 0.1 µm to about 200 µm.

15. The micro-valve of claim 11, wherein the second layer of silicon has a thickness of from about 150 µm to about 600 µm.

16. The micro-valve of claim 11, wherein the layer of an insulator has a thickness of from about 0.1 µm to about 10 µm.

17. The micro-valve of claim 1, wherein the second substrate has a thickness of from about 150 µm to about 650 µm.

18. The micro-valve of claim 1, wherein the first microconduit and second microconduit each have a diameter in a range of from about 5 µm to about 2 mm.

19. The micro-valve of claim 1, wherein a center of an output end of the first microconduit is separated from a center of an input end of the second microconduit by a distance in a range of from about 20 µm to about 2 mm.

20. The micro-valve of claim 1, further comprising a sealing ring positioned on the seating surface of the second substrate in a portion surrounding an output end of the first microconduit and input end of the second microconduit and which is in contact with the actuation membrane.

21. The micro-valve of claim 11, comprising a sealing ring etched through the first layer of silicon and through the layer of insulator and which is in contact with the actuation membrane.

22. The micro-valve of claim 1, wherein the seating surface has a diameter in a range of 50 µm to 5000 µm.

23. The micro-valve of claim 20, wherein the sealing ring has an outer diameter in a range of about 100 µm to about 6000 µm.

24. The micro-valve of claim 20, wherein the sealing ring has an inner diameter in a range of about 50 µm to about 5000 µm.

25. The micro-valve of claim 1, further comprising a pneumatic mechanism for applying the actuation force to the actuation membrane.

26. The micro-valve of claim 1, further comprising a piezoelectric mechanism for applying the actuation force to the actuation membrane.

27. The micro-valve of claim 1, further comprising an electromagnetic, electrostatic or thermopneumatic mechanism for applying the force to the actuation membrane.

28. The micro-valve of claim 1, wherein the actuation membrane further comprises at least one of a silicone layer, a metallic layer, and a combination thereof disposed thereon.

29. A micro-fluidic device comprising at least one micro-valve of claim 1.

30. The micro-fluidic device of claim 29, wherein the micro-fluidic device is a micro-injector.

31. A micro-injector, comprising:
   a plurality of micro-valves, each micro-valve comprising:
      a first substrate having a hole or channel extending through a portion thereof;
      a second substrate having an upper surface, a lower surface, and a recessed space in the upper surface, the recessed space comprising a seating surface, a first microconduit, and a second microconduit wherein the first microconduit and the second microconduit each extend from the seating surface to the lower surface and are in operative communication via the recessed space to form a fluid path; and
      an actuation membrane component comprising a layer of at least one poly(aryl ether ketone), the actuation membrane positioned between the first substrate and the second substrate over at least a portion of the seating surface such that when an actuation force is applied to the actuation membrane, the actuation membrane engages the seating surface of the second substrate wherein at least one of the first microconduit and the second microconduit become blocked to cause interruption of the fluid path; and
   wherein a first group of the plurality of micro-valves can be closed to allow collection of a fluid sample passed into the micro-injector and wherein a second group of the plurality of micro-valves can be closed to allow the fluid sample to be carried out of the micro-injector via a carrier fluid.

32. The micro-injector of claim 31, further comprising an actuation force layer for applying the actuation force to two or more of the micro-valves simultaneously.

33. The micro-injector of claim 31, wherein the plurality of micro-valves are etched in a single flow channel substrate which comprises a plurality of flow channels each of which is in fluid communication with the fluid path of at least one micro-valve.

34. The micro-injector of claim 31, further comprising a back-flush system for passing a carrier fluid in a reverse direction through a separation column connected in fluid communication to the micro-injector.

35. The micro-injector of claim 31, wherein the actuation force is provided via a pneumatic, piezoelectric, electromagnetic, electrostatic or thermopneumatic mechanism.

36. A method of modulating a fluid flow through a fluid path, comprising:
   providing a micro-fluidic system comprising a micro-valve which comprises:
      a first substrate having a hole or channel extending through a portion thereof;
      a second substrate having a recessed space comprising a seating surface, a first microconduit and a second microconduit, the openings of the first and second microconduit bounded by the seating surface, wherein the first microconduit and the second microconduit each extend from the seating surface to a position below the seating surface and are in operative communication via the recessed space to form a fluid path; and
      an actuation membrane comprising a layer of at least one poly(aryl ether ketone) positioned between the first substrate and the second substrate over at least a portion of the seating surface; and
   applying an actuation force to the actuation membrane causing a portion of the actuation membrane to engage the seating surface of the second substrate wherein at least one of the first microconduit and the second microconduit becomes blocked, thereby causing an interruption of the fluid flow through the fluid path.

* * * * *